United States Patent [19]

Hughes

[11] Patent Number: 4,608,062

[45] Date of Patent: Aug. 26, 1986

[54] CONTAMINATED AIR/WATER RECOVERY APPARATUS

[75] Inventor: Joel Hughes, Wilmington, N.C.

[73] Assignee: Container Products Corporation, Wilmington, N.C.

[21] Appl. No.: 711,195

[22] Filed: Mar. 13, 1985

[51] Int. Cl.[4] .................... B01D 19/00; B01D 46/12; B01D 50/00

[52] U.S. Cl. ......................... 55/186; 55/193; 55/318; 55/323; 55/481; 55/482; 55/504; 15/352; 15/353

[58] Field of Search ............... 15/352, 353; 55/186, 55/189, 190, 192, 193, 323, 481, 482, 504, 187, 188, 318

[56] References Cited

U.S. PATENT DOCUMENTS

| | | | |
|---|---|---|---|
| 3,034,273 | 5/1962 | Wallace | 15/353 |
| 3,570,222 | 3/1971 | Dudek | 55/481 |
| 4,310,945 | 1/1982 | Tribolet | 15/353 |
| 4,463,474 | 8/1984 | Jacobs | 15/353 |
| 4,487,618 | 12/1984 | Mann | 55/323 |
| 4,521,935 | 6/1985 | Johnston | 15/322 |
| 4,542,556 | 9/1985 | Hepple | 15/322 |
| 4,547,206 | 10/1985 | Sovis | 15/353 |

Primary Examiner—Ernest G. Therkorn

[57] ABSTRACT

An apparatus for the recovery of contaminated air and water from a flow system. The apparatus provides a high efficient compartmentized stacked design embodying removable filters that first effect a moisture separation and then air borne particle filtering, with such functions separated by a fluid collection tank. The apparatus provides structure for ready removal of the filters and collected fluid with minimum down time so as not to interrupt the recovery process.

8 Claims, 1 Drawing Figure

CONTAMINATED AIR/WATER RECOVERY APPARATUS

SUMMARY OF THE INVENTION

The recovery apparatus of this invention is adapted to be associated with a high temperature, low pressure vacuum spray cleaning head of the type shown and described in U.S. Pat. No. 4,521,935.

The recovery apparatus of this invention will receive the contaminated moisturized air flow recovered through an associated vacuum system which makes up no part of the present invention. The present invention embodies a compartmentized container having a first recovery head through which the contaminated air flow enters the apparatus. This recovery head through it's design deflects the air flow through a first compartment containing a demister, a removable packaged moisture separator. The air flow continues to carry the contaminated moisturized material downward to a collection tank, which in turn will deflect the remaining air borne contaminates upward through a second compartment containing a high efficient filter, with the filtered air then being exhausted through a discharge head into an exhaust air flow.

An object of this invention is to provide a highly efficient yet simple contamination recovery for fluid and/or steam cleaning apparatuses.

In devices of the prior art designed to be incorporated in air filtering and fluid recovery there is normally employed a large cyclone tank which would first intercept the contaminated air flow and which would require separate maintenance thus increasing the down time of the system. By the high efficiency stacked design the present invention overcomes this deficiency.

BRIEF DESCRIPTION OF THE DRAWING

The invention will be best understood by reference to the enclosed drawing which illustrate the preferred construction and mode of operation by which the stated objects of the invention are achieved and in which.

GENERAL DESCRIPTION

Figure 1:
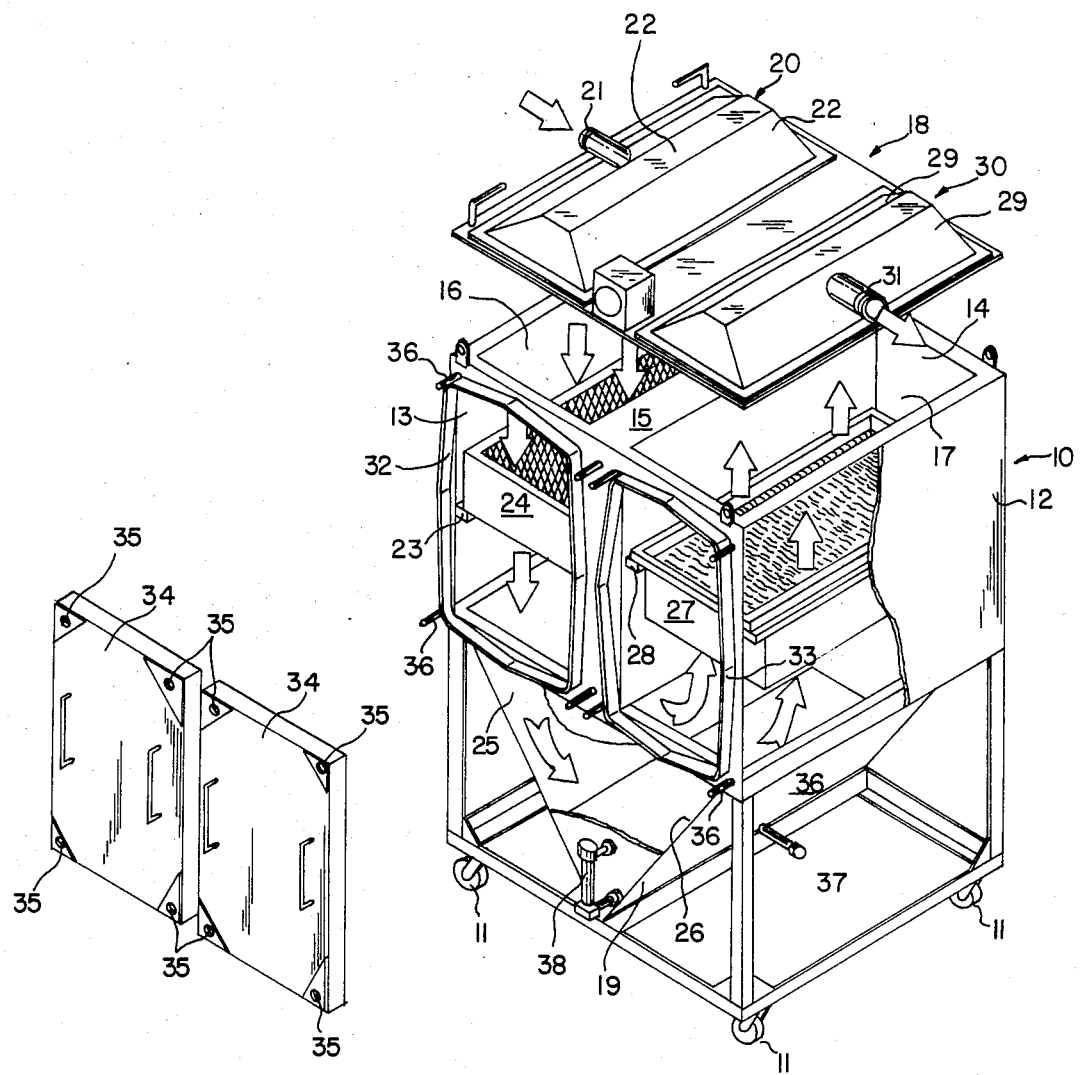
FIG. 1 is a fragmentary perspective view of the recovery apparatus with certain parts in exploded relation.

The contaminated air/water recovery apparatus of this invention is housed in a container 10 supported by a set of casters 11 so as to impart high mobility to the apparatus.

The container 10 is compartmentized and as such provides solid side walls 12 and 13 and a rear wall 14. A center partition 15 extends between and parallel to the side walls 12 and 13 so as to define the separate compartments. The compartments 16 and 17 provide open tops which are adapted to be closed by a top member 18, while each of their bottom portions are open to provide unrestricted communication with a liquid collection tank 19.

The top member 18 provides a truncated riser 20 that includes an inlet port 21 connected to a liquid steam cleaning and recovery system. The tapered walls 22 of the riser 20 function as deflectors against which the vacuum drawn decontaminated fluids are deflected into a downward path into the compartment 16.

Within the compartment 16 a set of rails 23 support a prepackaged demister or moisture separator 24. This demister will coagulate the larger particles of decontaminates onto liquid particles. These moistured decontaminates will be carried by the vacuum in the apparatus in a downward direction where they will impinge upon one tapered wall or baffle 25 of the collection tank 19, and into the fluid reservoir contained therein.

The air borne contaminates will be drawn over the collected liquids in the tank 19 and deflected by the opposite tapered wall or baffle 26 into an upward path. The upward path of the vaccumed air flow will enter through the bottom of the compartment 17 and will be drawn through a high efficiency air particle filter 27.

As shown the compartment 17 provides supporting rails 28 that removably support the prepeckaged filter 27.

The filtered air will continue in its upward path until it impinges upon the inclined walls 29 of the truncated discharge head 30 which in turn provides a side discharge port 31 from the apparatus for the filtered air.

Each of the compartments 16 and 17 provide in respective end walls openings defined by laterally extending peripheral flanges 32 and 33. These flanges 32 and 33 are adapted to project into closures or door members 34. Each of the closures 34 provide at their respective corners opening 35 which will receive connecting bolts 36 provided adjacent the wall opening, whereby the closures 34 are removably positioned and secured on the container 10.

The collection tank 19 is provided with a drain 37 for ease in removing the contaminated fluid therefrom as well as a level gauge 38 for indicating the level of its containment.

By the compartmentized, stacked arrangement together with the operational features of the apparatus there is created a negative pressure within the apparatus such that the contaminates drawn into the apparatus will have a first gravity flow direction through the demister 24. This gravity flow continues and is compressed by reason of the tapered walls 25 and 26 of the tank 19. This compression together with the negative pressure will create a vertical air borne path through the filter 27 and out of the discharge port 31 to a recovery system. The combination of deflected air flow, as well as the stacked arrangement of the demister 24 and the filter 27, relative to the liquid collection tank 26 results in a highly effective decontaminated air and water recovery system.

The readily removable demister 24 and filter 27, as required, through their respective individual side openings, as well as the liquid collection tank drain, permits constant maintenance of the apparatus with minimum down time. The system also minimizes the separated contaminates with the resulting costs of permanent disposal of reconditioning of the recovered elements.

While I have illustrated and described the preferred form of construction for carrying my invention into effect, this is capable of variation and modification without departing from the spirit of the invention. I therefore, do not wish to be limited to the precise details of construction as set forth, but desire to avail myself of such variations and modifications as come within the scope of the appended claims.

Having thus described the invention, what I claim as new and desire to protect by Letters Patent is:

1. A mobile contaminated air/water recovery apparatus adapted to be used with a vacuum powered recovery system, comprising, (a) a cabinet having an open top and a partially opened side wall,
(b) an interior divider forming compartments within said cabinet,
(c) a fluid collection tank closing the bottom of said cabinet with said compartments arranged in side by side relation and stacked upon said tank,
(d) a top closure for said cabinet divided into separate sections one for each of said compartments so as to provide access and egress from respective compartments,
(e) horizontally disposed filter means in each of said compartments, whereby contaminated air downwardly flows through one filter and upwardly flows through a filter downstream of said one filter,
(f) means removably supporting said filter means in each of said compartments whereby said filter means are accessible through said partially opened side wall of said cabinet, and
(g) means for closing said partially open side wall and each of said compartments.

2. A contaminated air/water recovery apparatus as defined by claim 1 wherein said means for closing said partially opened side wall of said compartment comprises a pair of removable doors adapted to fit upon opening defining flanges provided by said side wall of said cabinet.

3. A contaminated air/water recovery apparatus as defined by claim 1 wherein said filter means in each of said compartments comprise a first moisture separator and a second air filter, said moisture separator positioned in the gravity flow side of one of said compartments, with said air filter in the air flow side of said other of said compartments.

4. A contaminated air/water recovery apparatus as defined by claim 3 wherein said means for closing said partially opened side wall of said compartment comprises a pair of removable doors adapted to fit upon opening defining flanges provided by said side wall of said cabinet.

5. A contaminated air/water recovery apparatus as defined by claim 4 wherein said means removably supporting said filter means in each of said compartments include rails on opposite internal side wall surfaces of each of said compartments for removably supporting said filter means within said compartments of said cabinet.

6. A contaminated air/water recovery apparatus as defined by claim 1 wherein said means removably supporting said filter means in each of said compartments include rails on opposite internal side wall surfaces of each of said compartments for removably supporting said filter means within said compartments of said cabinet.

7. A contaminated air/water recovery apparatus as defined by claim 6 wherein said means for closing said partially opened side wall of said compartment comprises a pair of removable doors adapted to fit upon opening defining flanges provided by said side wall of said cabinet.

8. A contaminated air/water recovery apparatus as defined by claim 6 wherein said filter means in each of said compartments comprise a first moisture separator and a second air filter, said moisture separator positioned in the gravity flow side of one of said compartments, with said air filter in the air flow side of said other of said compartments.

* * * * *